United States Patent [19]

Philipson et al.

[11] 4,184,045

[45] Jan. 15, 1980

[54] SYSTEM AND METHOD FOR TRANSMISSION OF INFORMATION

[76] Inventors: Lars H. G. Philipson, Virvelvindsvägen 4I, S222 27 Lund; Gert-Åke G. Hansson, Örnvägen 32, S-222 31 Lund, both of Sweden

[21] Appl. No.: 909,601

[22] Filed: May 25, 1978

[51] Int. Cl.² .............................................. H04B 3/50
[52] U.S. Cl. ........................................ 178/68; 325/59; 178/63 R
[58] Field of Search .............. 340/345, 167 R, 167 P, 340/188 R, 188 CH; 179/15 BB; 325/40, 59, 60; 178/63 R, 63 B, 63 C, 68

[56] References Cited

U.S. PATENT DOCUMENTS

| 3,581,008 | 5/1971 | Dal Monte | 178/63 R |
| 3,827,026 | 7/1974 | Viswanathan | 340/167 R |
| 4,084,069 | 4/1978 | Looschen | 178/68 |

Primary Examiner—Benedict V. Safourek
Attorney, Agent, or Firm—Beveridge, De Grandi, Kline & Lunsford

[57] ABSTRACT

Serial transmission of binary information on a two-conductor line is effected by transmitting a periodic signal on one conductor and earthing the other conductor when a binary "0" is to be transmitted, while the periodic signal is transmitted on the other conductor and the first conductor is earthed when a binary "1" is to be transmitted. The sum of the signals transmitted via the two conductors is established for controlling the recovery of the binary information from the difference between the signals transmitted on the two conductors. On the transmitter side, use is made of a switch controlled by the binary information, for connecting the periodic signal to either of the two conductors and, on the receiver side, use is made of a correlator or a signal-adapted filter for recovering the transmitted information.

13 Claims, 10 Drawing Figures a b c d e f g h

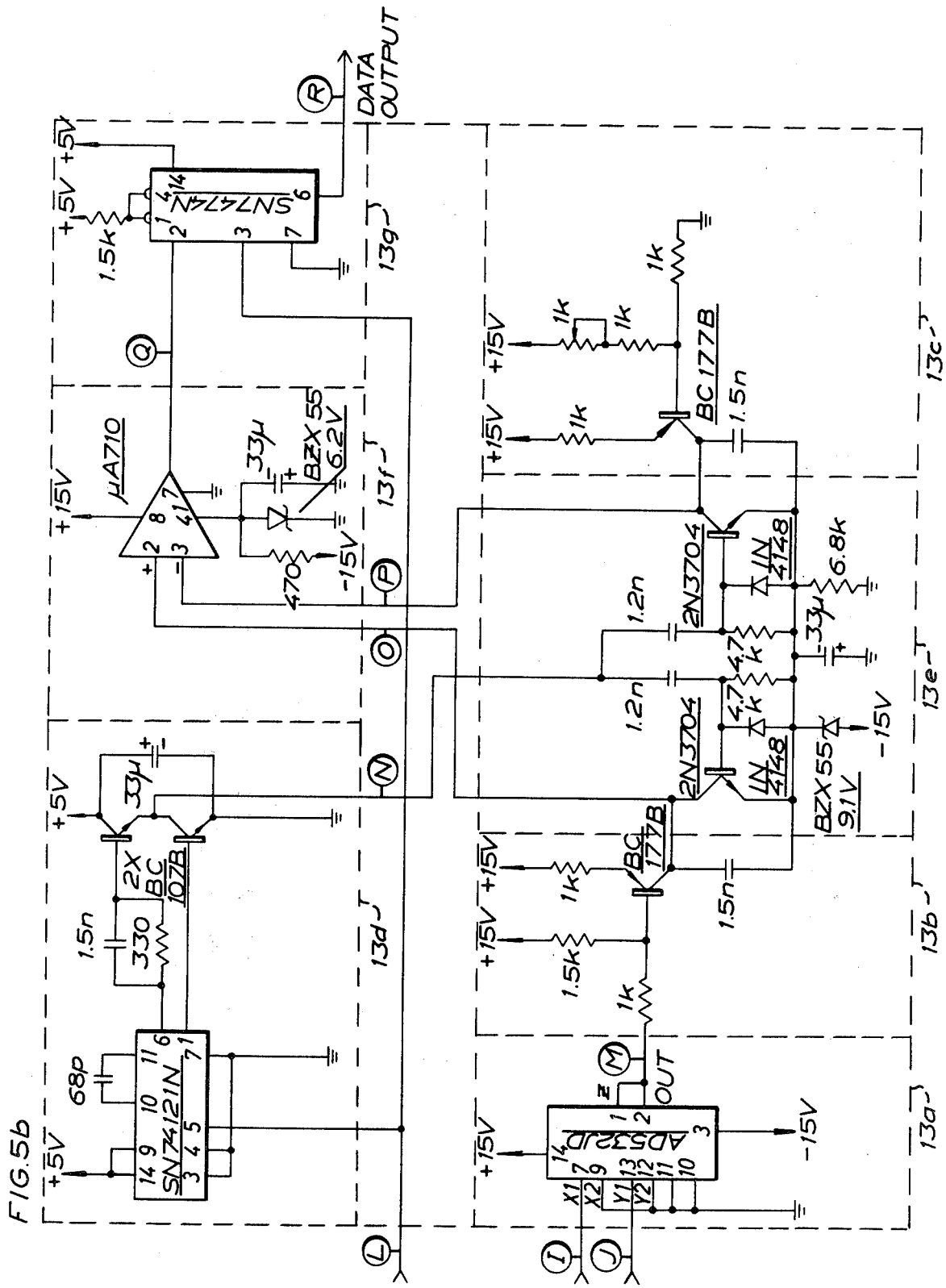

SYSTEM AND METHOD FOR TRANSMISSION OF INFORMATION

BACKGROUND OF THE INVENTION

1. Field of the Invention

The present invention generally relates to the transmission of digital information and more particularly to a system and a method for serial transmission of binary signals, i.e. binary-coded information.

2. Description of the Prior Art

For so-called modem transmission of digital information by a two-wire connection, there are a number of standardized methods. Frequency shift modulation is used up to 1200 baud and, at higher rates, differential phase shift modulation is used, possibly together with amplitude modulation.

The highest transmission rate standardized for two-wire connections is 48 kilobaud (cf. CCITT recommendation V35). In this instance, it is necessary to use relatively complicated transmitters and receivers with, for instance, automatic adaptive equalization of the characteristics of the transmission channel. In addition, in order to maintain the synchronism between transmitter and receiver one has to resort to so-called scrambling, which ensures a sufficiently frequent bit alternation.

By using carrier frequency systems, it is possible to obtain transmission rates considerably higher than those indicated above. However, such systems necessitate the use of complicated appliances on both the transmitter and the receiver side, as well as more expensive lines, for instance coaxial cables.

SUMMARY OF THE INVENTION

According to the invention, the transmission of binary information is realized in that a periodic signal is transmitted on one or the other of two conductors in accordance with the binary information to be transmitted. Preferably, the bit rate of the information is synchronized with the frequency of the periodic signal, such that for each bit of the binary information one period of the periodic signal is transmitted on either of the conductors in dependence upon whether the bit is a logic 1 or a logic 0. It is however quite feasible, for each bit, to transmit several periods of the periodic signal.

The invention is easy to realize and permits transmission of digital information at a high transmission rate while using a simple two-wire line, it being possible to maintain considerable insensitivity to external disturbances. This transmission may be effected over distances of medium length; thus, for instance, transmission has been effected experimentally at a rate in the order of 1 Mbaud, on an ordinary plastic insulated telephone line of a simulated length of 10 km. The invention is particularly applicable to the communication in a computer system between the computer and a peripheral unit, for instance display unit or data collecting unit, as well as between computer systems.

BRIEF DESCRIPTION OF THE DRAWINGS

FIGS. 5a and 5b are circuit diagrams of an embodiment of the receiver unit of FIG. 1;

DESCRIPTION OF THE PREFERRED EMBODIMENTS

Figure 1:
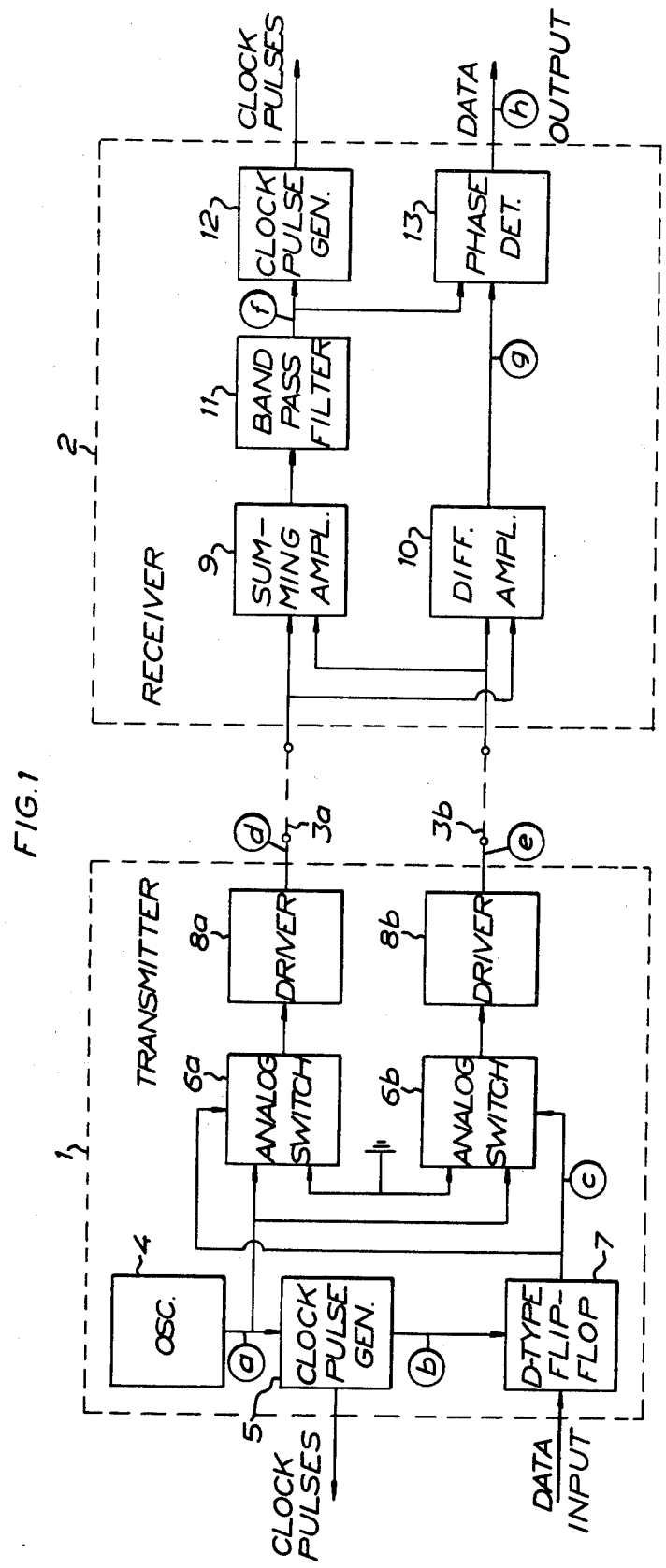
FIG. 1 is a block diagram of the preferred embodiment of the system according to the invention.

Referring now to FIG. 1, the transmission system of the invention comprises a transmitter unit 1 and a receiver unit 2 which are galvanically connected to each other by two conductors 3a, 3b which may advantageously consist of an ordinary cheap non-shielded two-wire lead. Here, the only requirement is that the conductors run relatively near each other, preferably in parallel with each other. The simplest way to achieve this is to use a line in which the conductors are fixed relative to each other by means of a common insulation.

The transmitter unit 1 comprises a sine wave oscillator 4, the output of which is connected both to the input of a clock pulse generator 5 and to the inputs of two analog switches 6a, 6b. The clock pulse generator 5 has a first output connected to the clock input of a D-type flip-flop 7, and a second output for controlling the input of data to be transmitted. The output of the D-type flip-flop 7 is connected to the control inputs of the analog switches 6a, 6b. The two outputs of the transmitter unit 1, which are connected to the conductors 3a, 3b, are coupled via drivers 8a, 8b each to a respective output of the analog switches 6a, 6b.

In the receiver unit 2, the two conductors 3a, 3b are connected both to the inputs of a summing amplifier 9 and to the two inputs of a differential amplifier 10. The output of the summing amplifier 9 is connected via a band-pass filter 11 tuned to the frequency of the oscillator 4, on the one hand, to a clock pulse generator 12 and, on the other, to one input of a phase detector 13, the other input of which is connected to the output of the differential amplifier 10.

The mode of operation of the transmission system of FIG. 1 is as follows.

Figure 2:
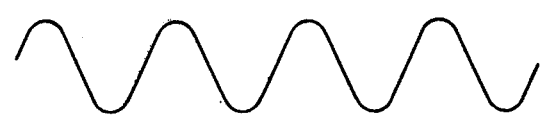
FIG. 2 illustrates signal waveforms appearing in the system of FIG. 1.
Figure 2:
Figure 2:
Figure 2:
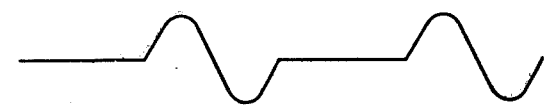
Figure 2:
Figure 2:
Figure 2:
Figure 2:
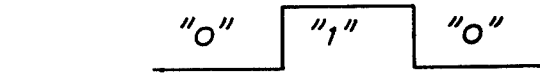

The clock pulse generator 5 generates on its outputs square pulse trains of the same frequency as the sine wave signal generated by the oscillator 4 (see FIG. 2a), the sine wave signal determining the transmission rate of the system. The clock pulses applied to the D-type flip-flop 7 are shown in FIG. 2b. The clock pulses on the other output of the clock pulse generator 5 control the input of data in serial form to the D-type flip-flop 7 which ensures well-defined transitions between the two levels of the data input signal, which represent logic 0 and logic 1, respectively. The form of an exemplifying data signal after passing the D-type flip-flop 7 appears from FIG. 2c. The data signal controls the analog switches 6a, 6b. When the data signal has the level representing logic 1, the switch 6a thus permits passage of the signal on the output of the oscillator 4, while zero potential is applied to the output of the analog switch 6b. Similarly, when the data signal has the level representing logic 0, the switch 6b permits passage of the output signal of the oscillator 4 and zero potential is applied to the output of the switch 6a. The drivers 8a, 8b serve as buffers towards the line 3 and have low inner impedance. The waveforms of the signals on the outputs of the drivers 8a, 8b are shown in FIGS. 2d and 2e, respectively.

In the receiver unit 2, the summing amplifier 9 generates on its output a signal which represents the sum of the signals transmitted by the conductors 3a, 3b. After passing the filter 11, this summation signal has the shape shown in FIG. 2f, i.e. it corresponds to the sine wave signal of the oscillator 4, and so, the clock pulse generator 12 can derive therefrom a clock pulse train in the same way as the clock pulse generator 5. The differential amplifier 10, on the other hand, generates a signal (FIG. 2g) which represents the difference between the signal on the conductor 3a and the signal on the conductor 3b. The phase detector 13 receiving said summation and differential signals may be described as comparing the relative phase positions of these signals, this indicating whether a logic 1 or a logic 0 has been transmitted. The result of this comparison is read with the greatest reliability at the end of each period. The data signal is hereby regenerated (see FIG. 2h). The clock pulses on the putput of the generator 12 indicate when the data bits are available on the output of the phase detector 13.

If the conductors 3a, 3b run near and parallel to each other, all external disturbances will affect both signals transmitted by the conductors 3a, 3b substantially equally. Further, if the differential amplifier 10 has a sufficiently high common mode rejection ratio, such symmetrical disturbances will not affect the differential signal. The band-pass filter 11 eliminates the influence of these disturbances on the summation signal.

The capacitance between the conductors 3a, 3b sets on upper limit for the transmission rate in the above-defined system. Thus, the differential signal decreases gradually as the transmission distance increases. In other words, for a given line type, the maximum transmission rate usable decreases as the transmission distance increases.

Although it is self-evident to anyone skilled in the art how the blocks of FIG. 1 may be realized, a brief description will be made below with reference to FIGS. 3-7, stating a specific and at present preferred realization comprising two alternative embodiments of the phase detector 13.

Figure 3A:
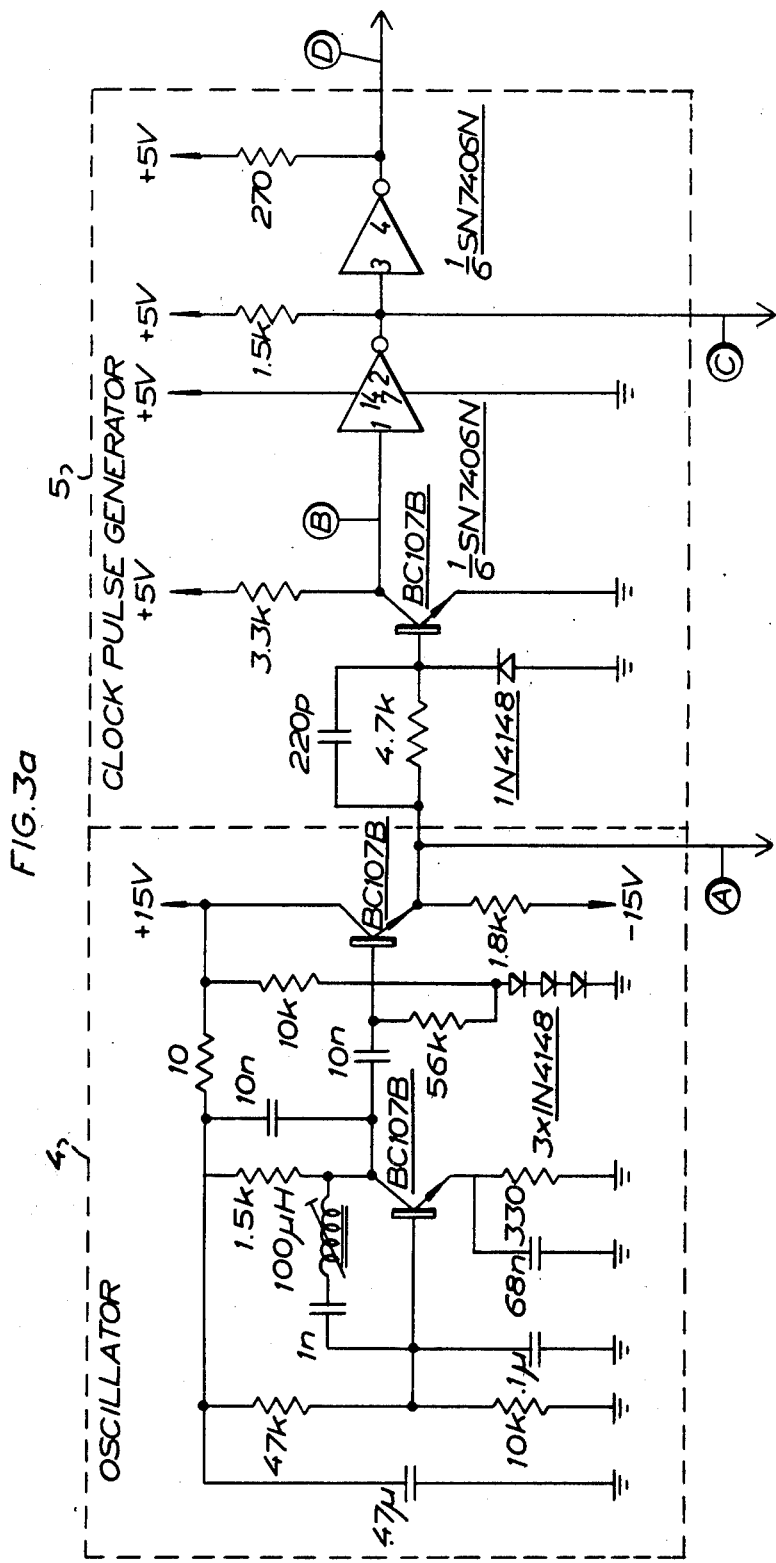
FIGS. 3a and 3b are circuit diagrams of an embodiment of the transmitter unit of FIG. 1.
Figure 3B:
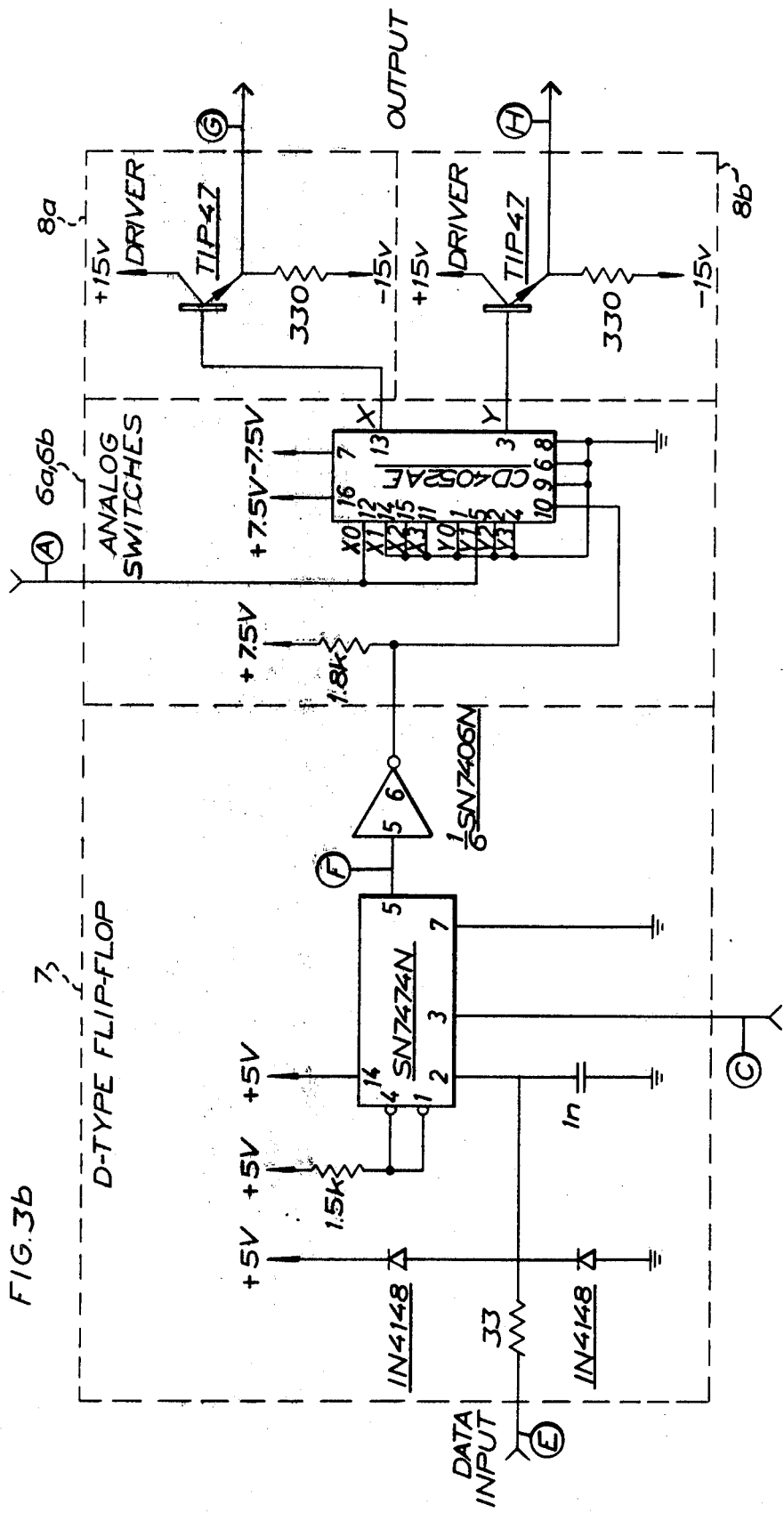
Figure 4:
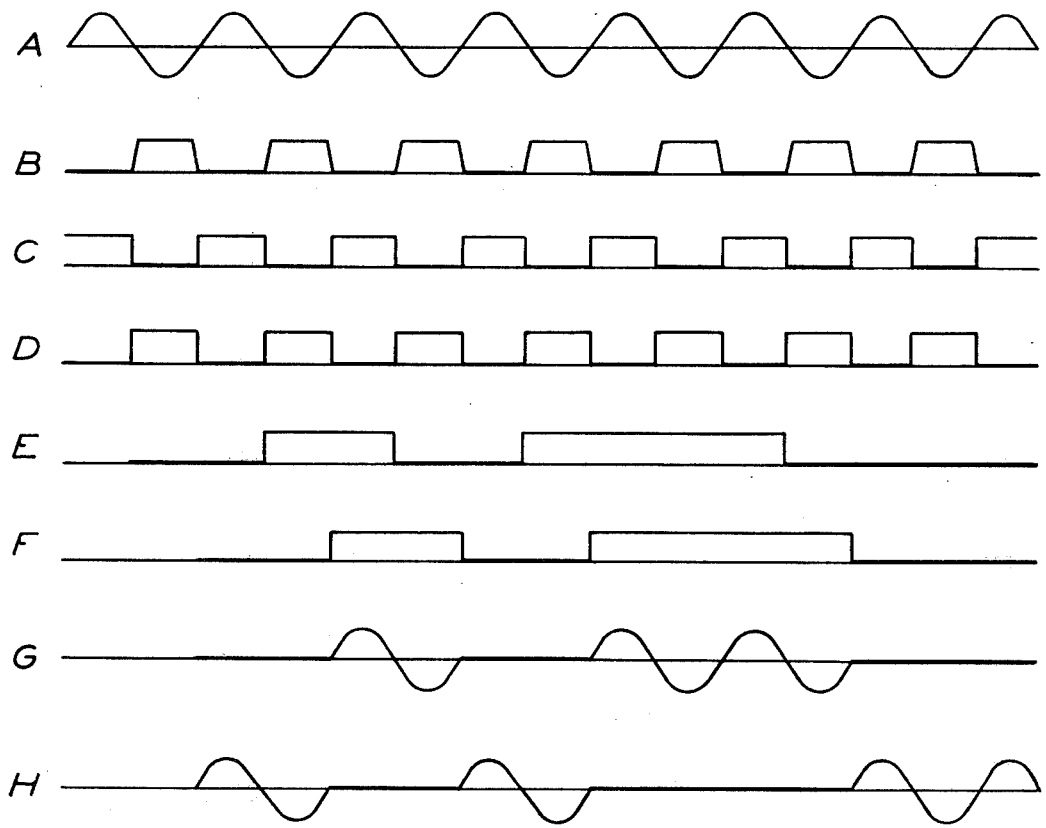
FIG. 4 illustrates signal waveforms appearing in the transmitter unit of FIGS. 3a and 3b.

In FIG. 3a, there is shown a circuit solution for the oscillator 4 and the clock pulse generator 5, and in FIG. 3b there is shown a circuit solution for the D-type flip-flop 7, the analog switches 6a, 6b and the drivers 8a, 8b. The waveforms A-H shown in FIG. 4 appear at the locations marked with equivalent references in FIGS. 3a, 3b. It would not seem necessary to give a more detailed description of the circuits in FIGS. 3a, 3b and their mode of operation.

Figure 5A:
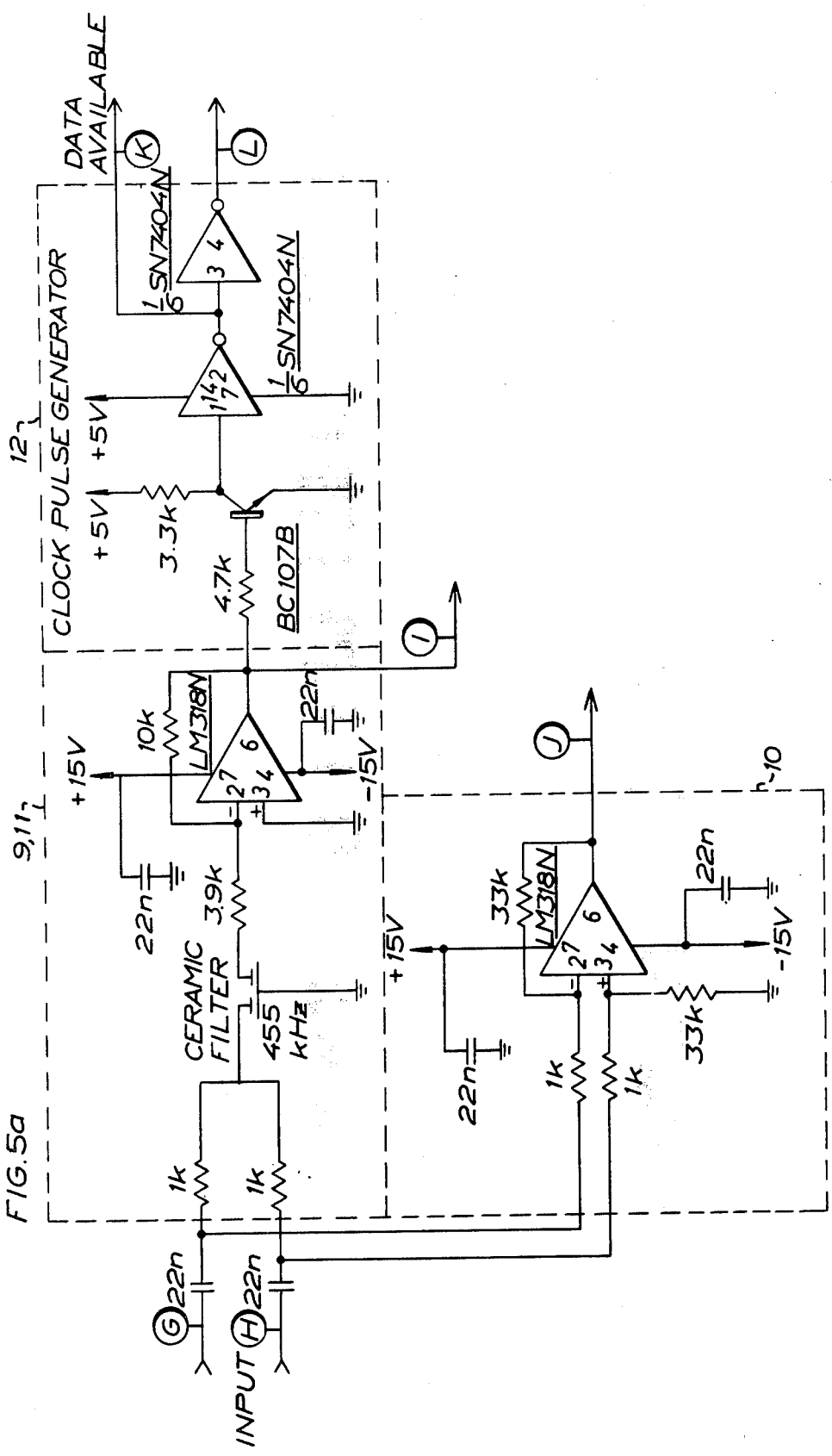
Figure 6:
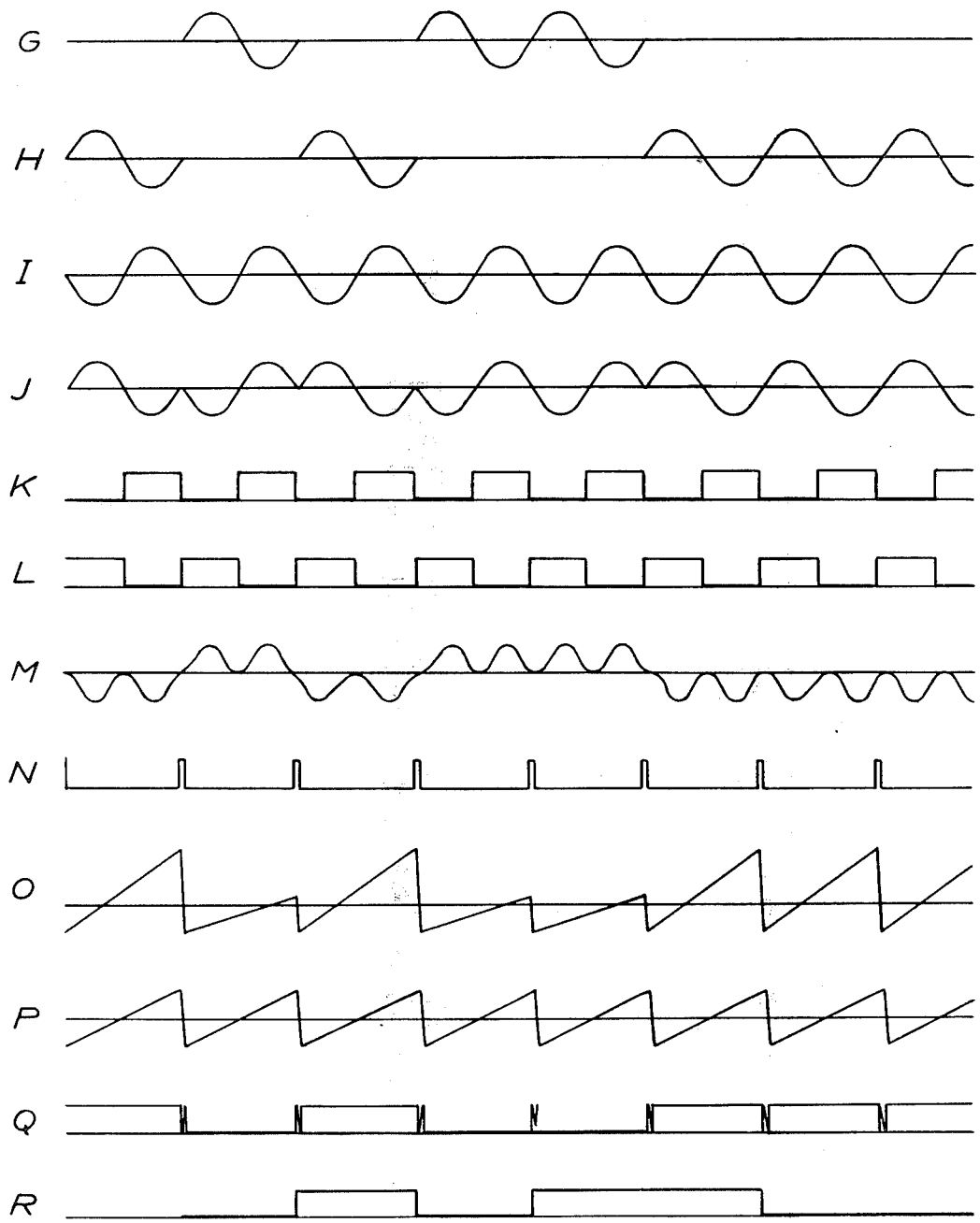
FIG. 6 illustrates signal waveforms appearing in the receiver unit of FIGS. 5a and 5b.

In FIG. 5a, there is shown a circuit solution for the amplifiers 9 and 10, the band-pass filter 11 and the clock pulse generator 12. FIG. 5b illustrates a circuit solution for the phase detector 13. The waveforms G-R shown in FIG. 6 appear at the locations marked with equivalent references in FIGS. 5a, 5b.

As appears from FIG. 5a, the summation of the signals arriving at the receiver 2 by the two conductors 3a, 3b is effected by means of two resistors which are connected to the input of a ceramic filter of the frequency of the sine wave oscillator 4, here 455 kHz, the output of the filter being connected to an operational amplifier. The other components of the circuit of FIG. 5a would not seem to require any detailed description.

The phase detector 13 shown in FIG. 5b is designed as a correlator and comprises an analog multiplier 13a which receives the summation signal I and the differential signal J and forms the product signal M which is applied to an integrator 13b. A second integrator 13c integrates an adjustable D.C. reference signal. A reset control circuit 13d comprises a monostable flip-flop which receives the output pulses L of the clock pulse generator 12 for generating a short pulse N at the end of each period, such as defined by the received summation signal. These short pulses N control a reset circuit 13e for resetting the integrators 13b, 13c. The output of the integrators 13b, 13c are connected each to a respective input of a comparator 13f, the output of which is connected to the input of a D-type flip-flop 13g whose clock input is supplied with the clock pulses L from the generator 12. The D-type flip-flop 13g is then set, in agreement with the output signal of the comparator 13f, immediately before the resetting of the integrators 13b, 13c. The data signal, delayed by one period, is thereby recreated on the output of the D-type flip-flop 13g.

The correlator described above and serving as phase detector 13 is based upon a phase position determination with the aid of a correlation integral of the type $$\int_0^T y(t)s(t)dt,$$

the value of the integral at the end of each period, i.e. t=T, of the transmitted signal being utilized. In this case, the differential signal J is used as y(t) and the summation signal I may be used as s(t), since the parts of the differential signal I which represent a logic 1 and a logic 0, respectively, are antipodal or negatively correlated.

Figure 7A:
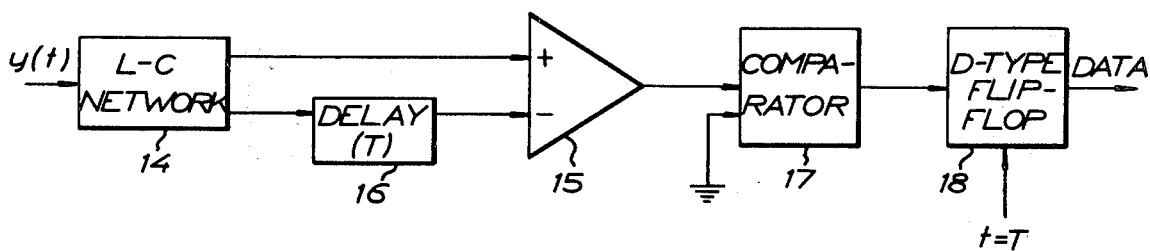
FIG. 7a is a block diagram of a signal-adapted filter usable in the system of the invention.
Figure 7B:
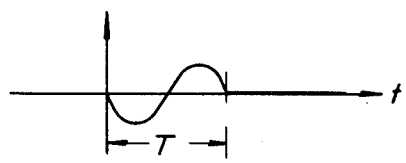
FIG. 7b illustrates the impulse response of the filter.

As shown in FIG. 7a, the value of the correlation integral may alternatively be determined by means of a signal-adapted filter with an impulse response (see FIG. 7b) which may be described as constituting one period of the output signal of the oscillator 4 as mirrored in the y-axis and thereafter phase-shifted by one period. When the output signal of the oscillator 4 is a sinusoidal signal, such a filter may be realized by means of an L-C network 14 and a differential amplifier 15 which establishes the difference between the direct output signal of the L-C network 14 and the same output signal delayed by the cycle time (T) of the transmitted signal by means of a delay circuit 16. The output signal of the differential amplifier 15 is compared in a comparator 17 with zero potential, and the output signal of the comparator 17 is allowed, at the end of each period, to control the state of a D-type flip-flop 18. In this case, too, the data signal, delayed by one period, is recreated on the output of the D-type flip-flop 18. A more thorough explanation of the theory behind correlators and signal-adapted filters is given in, for instance, van Trees, H. L., "Detection, Estimation and Modulation Theory," Part II, Wiley & Sons, 1971, and Lucky R. W., Salz, J. & Weldon Jr., E. J.: "Principles of Data Communication," McGraw-Hill, 1968.

The advantages of the system and the method of the invention may be summed up as follows:

(1) A cheap line, in general a non-shielded double conductor, may be used. Galvanic connection must however be maintained over the entire transmission length; thus, it is not possible to insert, for instance, transformers. Further, the conductors should run substantially along the same path, such that disturbances will affect the signals on the conductors substantially symmetrically.

(2) The electronic build-up of the transmitter and the receiver will be simple.

(3) For medium-length transmission distances it is possible to attain a high transmission rate and low sensitivity to disturbances. Since the synchronization ensured by the summation signal is independent of what data are transmitted, no scrambling is required.

(4) Several transmitters and receivers may be connected to the same two-wire line in that, for instance, the transmitter can be disconnected from the line when no transmission is in progress. In such a system, bidirectional communication may be effected, for instance, by a conventional polling method.

(5) Since the information transmission is effected under A.C. conditions, a D.C. voltage component may be used to indicate polarity. A D.C. voltage component may also be used to indicate that transmission is going on in a system having several transmitters and receivers.

What we claim and desire to secure by Letters Patent is:

1. A system for serial transmission of binary information comprising:
   (a) a transmitter unit adapted to be connected to one end of each conductor of a pair of conductors and including:
      (i) a periodic signal generator, for generating a periodic signal;
      (ii) means for receiving binary information to be transmitted; and
      (iii) connecting means responsive to the received binary information and adapted for connecting the periodic signal from said periodic signal generator to one of the conductors during one signal level of the received binary information while holding the other of the conductors at a reference potential and for connecting the periodic signal from said periodic signal generator to said other of the conductors during the other signal level of the received binary information while holding said one of the conductors at a reference potential; and
   (b) a receiver unit adapted to be connected to the other end of each conductor and including:
      (i) summing means for summing the received signals on the two conductors to provide a summation signal;
      (ii) difference means for subtracting the received signals on the two conductors to provide a differential signal; and
      (iii) signalling means responsive to the summation and differential signals for regenerating the binary information.

2. A system as claimed in claim 1 in which said connecting means comprises switch means.

3. A system as claimed in claim 2 in which said switch means is adapted to connect the periodic signal from said periodic signal generator to a conductor for one period of the periodic signal for each bit of the binary information.

4. A system as claimed in claim 1 in which said transmitter unit further includes means for synchronizing the appearance of bits of the received binary information with the periodic signal.

5. A system as claimed in claim 1 in which:
   (a) said periodic signal generator comprises a sine wave oscillator;
   (b) said connecting means includes:
      (i) two analog switches, each analog switch having a signal input connected to said oscillator for receipt of the periodic signal therefrom, an output adapted to be connected to one of said conductors, and a control input;
      (ii) a clock pulse generator having an input connected to said oscillator for receipt of the periodic signal therefrom, and an output and responsive to the periodic signal for generating clock pulses;
      (iii) a flip-flop having a clock input connected to said clock pulse generator for receipt of clock pulses therefrom, a signal input connected to said means for receiving binary information, and an output connected to the control input of each of said analog switches, said flip-flop output providing to said control inputs a control signal indicative of the signal level of the binary information being received during initiation of the most recent clock pulse to control the switching state of said analog switches in accordance with said signal level.

6. A system as claimed in claim 1 in which said signalling means includes a phase detector for regenerating the binary information.

7. A system as claimed in claim 6 in which said signalling means further includes a band-pass filter tuned to the frequency of the periodic signal and coupling said summing means with said phase detector.

8. A system as claimed in claim 6 in which said phase detector regenerates the binary information as a function of the correlation between the sum and the difference of the received signal.

9. A system as claimed in claim 8 in which said phase detector comprises a correlator.

10. A system as claimed in claim 8 in which said phase detector comprises a signal-adapted filter.

11. A system as claimed in claim 1 further comprising two conductors interconnecting said transmitter unit and said receiver unit galvanically, at least when information transmission is in progress.

12. A method of transmitting binary information on a pair of conductors comprising the steps of:
    transmitting a periodic signal on one of the conductors while holding the other of the conductors at a reference potential during one signal level of the binary information;
    transmitting the periodic signal on said other of the conductors while holding said one of the conductors at the reference potential during the other signal level of the binary information;
    receiving the transmitted periodic signals;
    summing the received periodic signals to provide a summation signal;
    subtracting the received periodic signals to provide a differential signal; and
    regenerating the binary information as a function of the summation and differential signals.

13. A method as claimed in claim 12 comprising transmitting one period of the periodic signal for each bit of the binary information.

* * * * *